No. 652,026. Patented June 19, 1900.
E. JACQUEMIN.
CAR AXLE BRASS.
(Application filed Dec. 9, 1899.)
(No Model.)

WITNESSES
E. G. Siande
M. E. Gooley

INVENTOR
EUGENE JACQUEMIN
BY Paul O. Hawley
HIS ATTORNEYS

UNITED STATES PATENT OFFICE.

EUGENE JACQUEMIN, OF MINNEAPOLIS, MINNESOTA.

CAR-AXLE BRASS.

SPECIFICATION forming part of Letters Patent No. 652,026, dated June 19, 1900.

Application filed December 9, 1899. Serial No. 739,765. (No model.)

*To all whom it may concern:*

Be it known that I, EUGENE JACQUEMIN, of the city of Minneapolis, county of Hennepin, State of Minnesota, have invented a certain new and Improved Car-Axle Brass, of which the following is a specification.

This invention relates to improvements in "brasses" or bearings for car-axles; and the invention consists generally in a brass having in its bearing-face a series of diagonal grooves terminating in pockets that are larger than the grooves and whereby the lubricating material is evenly distributed over the face or wearing-surface of the bearing, and which grooves serve to collect and conduct away any grit that is taken up by the axle, whereby much wear is avoided.

Figure 1:
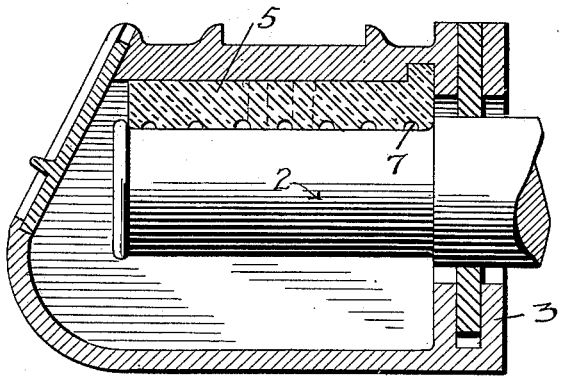
Figure 2:
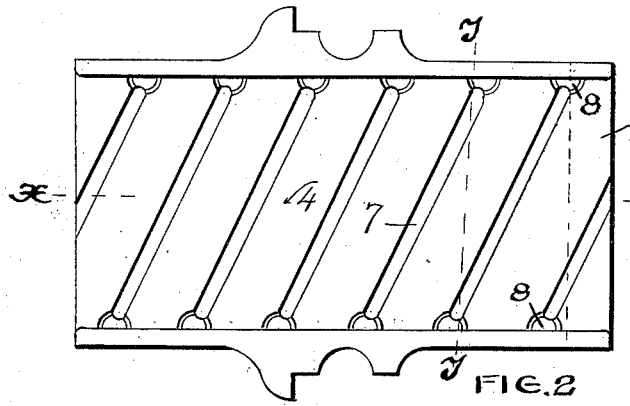
Figure 4:
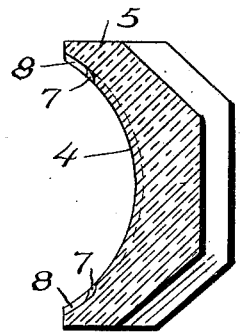
Figure 3:
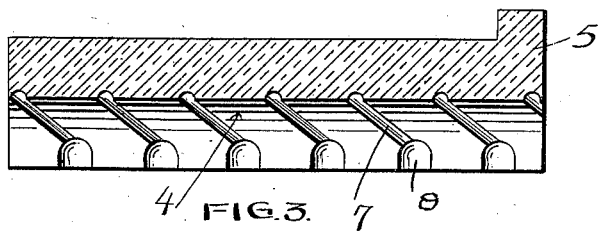

In the accompanying drawings, forming part of this specification, Figure 1 is a longitudinal vertical section of a car-axle having my improved bearing arranged therein. Fig. 2 is a view looking at the under side of the bearing or brass. Fig. 3 is a section on line $x$ $x$ of Fig. 2. Fig. 4 is a section on line $y$ $y$ of Fig. 2.

In the drawings, Fig. 1, 2 represents the journal portion of an ordinary car-axle, and 3 the usual journal-box. The box is provided, as usual, with a removable bearing or brass 5. The brass 5 in its wearing or journal face 4 has a series of diagonal grooves 7. These grooves preferably terminate in the pockets 8 in the lower edges of the brass. The lower part of the journal-box is usually stuffed with waste, which is saturated with oil, and as the axle rotates the oil is carried upward thereby into the pockets 8 on one side of the bearing or brass and will be carried through the grooves and from thence distributed evenly upon every part of the bearing-surface 4, no part being allowed to remain dry. The surplus lubricant will pass out through the other ends of the grooves and any grit that collects upon the axle or in the waste and is carried into the journal will be carried into and caught by the grooves, from which the grit will be washed by the streams of oil, so that the bearing-surface 4 is saved and cutting or undue wear is avoided. I prefer that the grooves 7 should be arranged at such an angle that the ends thereof overlap upon opposite sides of the bearing, thus assuring an even distribution of oil upon the bearing-surface 4.

The brass is provided with the usual lugs and locking-surfaces to engage the lugs in the top of the journal-box.

The diagonal grooves may extend only part way across the bearing; but the construction shown is preferable.

Having thus described my invention, I claim as new and desire to secure by Letters Patent—

A car-axle brass, having the usual holding-lugs or locking-surfaces, and provided with a series of diagonal grooves in its wearing-surface, said grooves terminating in the larger pockets at the ends, as described, and for the purpose specified.

In testimony whereof I have hereunto set my hand, this 5th day of December, 1899, at Minneapolis, Minnesota.

EUGENE JACQUEMIN.

In presence of—
RICHARD PAUL,
C. G. HAWLEY.